US00RE41773E

(19) United States
(12) Reissued Patent
Ahmavaara et al.

(10) Patent Number: US RE41,773 E
(45) Date of Reissued Patent: Sep. 28, 2010

(54) SIGNALLING METHOD

(75) Inventors: Kalle Ahmavaara, San Diego, CA (US); Jukka Vialen, Espoo (FI)

(73) Assignee: QUALCOMM Incorporated, San Diego, CA (US)

(21) Appl. No.: 11/454,183

(22) Filed: Jun. 15, 2006

Related U.S. Patent Documents

Reissue of:
(64) Patent No.: 6,751,227
Issued: Jun. 15, 2004
Appl. No.: 09/704,205
Filed: Nov. 1, 2000

(30) Foreign Application Priority Data

Nov. 2, 1999 (FI) ..... 19992369

(51) Int. Cl.
*H04L 12/28* (2006.01)
*H04L 12/56* (2006.01)

(52) U.S. Cl. ..... 370/410; 455/452.1; 455/452.2; 370/522; 370/524; 370/352

(58) Field of Classification Search ..... 455/452.1, 455/452.2; 370/410, 522, 524, 328, 329, 370/338, 35–355, 356, 252, 310.1, 310.2, 370/395.21, 468
See application file for complete search history.

(56) References Cited

U.S. PATENT DOCUMENTS

| | | | | |
|---|---|---|---|---|
| 5,666,348 | A | 9/1997 | Thornberg et al. | 370/230 |
| 6,047,005 | A | 4/2000 | Sherman et al. | 370/522 |
| 6,108,552 | A | 8/2000 | Edwards et al. | 455/452 |
| 6,236,656 | B1 | 5/2001 | Westerberg et al. | 370/395 |
| 6,374,112 | B1 | 4/2002 | Widegren et al. | 455/452 |
| 6,389,008 | B1 | 5/2002 | Lupien et al. | 370/352 |
| 6,483,820 | B1 | 11/2002 | Davidson et al. | 370/329 |
| 6,553,006 | B1 | 4/2003 | Kalliokulju et al. | 370/310 |
| 6,594,238 | B1 | 7/2003 | Wallentin et al. | 370/252 |
| 6,606,311 | B1 | 8/2003 | Wang et al. | 370/338 |
| 6,608,832 | B2 | 8/2003 | Forslow | 370/353 |

FOREIGN PATENT DOCUMENTS

| | | |
|---|---|---|
| GB | 2312810 A | 11/1997 |
| WO | WO 93/15583 | 8/1993 |
| WO | WO 98/03030 | 1/1998 |
| WO | WO 98/30042 | 7/1998 |
| WO | WO 99/16264 | 4/1999 |
| WO | WO 99/39525 | 8/1999 |
| WO | WO 99/39528 | 8/1999 |
| WO | 99040741 | 8/1999 |
| WO | WO 99/53668 | 10/1999 |

OTHER PUBLICATIONS

Japanese Patent Document No. 09–502075.
Japanese Patent Document No. 11–205855.
International Search Report dated Feb. 16, 2001 for Int. App. No. PCT/FI00/00955.
Japanese Office Action dated Jul. 23, 2002 for App. No. Tokugan 2000–321477.
Japanese Office Action dated May 13, 2003 for App. No. Tokugan 2000–321477.

*Primary Examiner*—Sujatha Sharma
(74) *Attorney, Agent, or Firm*—Darren M. Simon

(57) ABSTRACT

The invention relates to methods for transmission of signalling data in cellular telecommunication networks. According to the invention, multiple radio bearers can be allocated for transferring signalling traffic, but all higher layer signalling is in any case taken through the RRC protocol. In the inventive method, MM and higher layer messages are sent using RRC DIRECT TRANSFER messages, but a separate RLC entity is set up for RRC DIRECT TRANSFER messages. In various embodiments of the invention, separate radio bearers can be set up for individual CN domains and/or upper layer protocols and/or for a group of RRC messages.

55 Claims, 5 Drawing Sheets

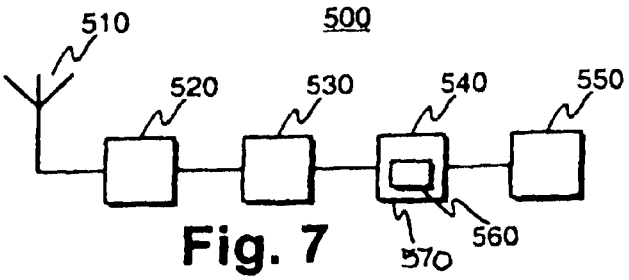
Fig. 7
(AMENDED)

SIGNALLING METHOD

Matter enclosed in heavy brackets [ ] appears in the original patent but forms no part of this reissue specification; matter printed in italics indicates the additions made by reissue.

BACKGROUND OF THE INVENTION

1. Field of the Invention

The invention relates to methods for transmission of signalling data in cellular telecommunication networks. Especially, the invention is related to such a method as specified in the preamble of the independent method claim.

2. Description of Related Art

The current concept of a signalling radio bearer in the UMTS system (universal mobile telecommunication system) defines that there is only one radio bearer for signalling traffic between the cellular network and a mobile communication means. Both the RRC (radio resource control) and higher protocol layers use the same radio bearer, i.e. the same RLC (radio link control) entity. In some implementations it is possible to have two RLC entities for signalling traffic, one entity for unacknowledged mode transfer and one entity for acknowledged mode transfer. However, there is currently no means to treat these entities separately for example for setup, reconfiguration or release. The signalling radio bearer, sometimes called the signalling link, is set up during the RRC connection establishment procedure. In some implementations, it is even possible that the radio bearer service is actually provided by the PDCP layer. In this case the PDCP will run in transparent mode for signalling traffic.

Higher layer messages, such as MM (mobility management) or CM (connection management) layer messages are carried between a mobile communication means and the network in a RRC DIRECT TRANSFER message payload. The protocol stack is illustrated in FIG. 1. FIG. 1 shows an example of a partial protocol stack of a circuit switched core network (CN) domain, which protocol stack comprises connection management (CM) and mobility management (MM) protocol layers, and an example of a protocol stack of a packet switched core network domain, which protocol stack comprises session management (SM) and packet switched domain mobility management (PMM) protocol layers. Both of these protocol stacks communicate with the RRC (radio resource control) layer, which handles the transmission of the higher layer protocol messages in a RRC DIRECT TRANSFER MESSAGE payload. The radio link control protocol can be set up to provide unacknowledged or acknowledged data transmission service. Each RLC instance is configured by RRC to operate in one of three modes: transparent mode (Tr), unacknowledged mode (UM) and acknowledged mode (AM). The transparent and unacknowledged mode are used by some of the RRC signalling procedures. Majority of RRC signalling procedures including the Direct Transfer procedure utilize acknowledged mode transfer. The service that the RLC layer provides to upper layers is called radio bearer (RB). A radio bearer with the corresponding Iu bearer comprises a radio access bearer (RAB).

The problems with the prior art solution used at the time of writing this patent application are mainly related to priority control of signalling traffic. A problem can arise for example in a case, when a very long higher layer message is passed to RLC layer which buffers the message, and when a time critical RRC message also needs to be sent. In this situation, the RLC layer transmits the buffered messages first before transmitting more recent messages, which results in a delay of the time critical RRC message. Currently there are no mechanisms allowing priorization of more recent messages over those messages waiting in RLC transmission buffer. It is also possible that higher layer signalling such as MM and CM will need some prioritization means between the various higher layer protocols.

At the time of writing this patent application, a requirement has recently been identified which may finally require that several signalling radio bearers can be set up so that different QoS (quality of service) parameters can be used for different types of signalling. One solution for this requirement has been proposed. According to this solution, MM and higher layer signalling is carried over the air interface like any user traffic, in a separate radio bearer. This solution creates some problems related to integrity control function—which is defined as a RRC layer function—and to the existing procedures in Iu interface.

FIG. 2 illustrates protocol stack configuration for signalling transfer according to a recently proposed solution. According to this solution, signalling traffic of MM and other higher layer protocols are transmitted directly using PDCP services. In this solution, only function that would be required from PDCP layer is the integrity protection. According to the solution, either one user plane radio bearer is used for all higher layer signalling protocols or a separate user plane radio bearer is allocated for each higher layer protocol stack. In the example of FIG. 2 each CN domain employs a different radio access bearer (RAB) for signalling between UE and each CN domain. According to this solution, priority control between MM and RRC messages can be handled in RLC/MAC using normal radio bearer/logical channel priority control mechanisms.

This proposal has some disadvantages. For example, the proposed solution increases the complexity of the MM and PMM protocol implementations, since primitive interfaces arc needed not only for the RRC protocol, but for the PDCP protocol as well. The proposed solution would also be an addition to current PDCP functions and change radically the basic function of PDCP as a packet service dependent sublayer. This would add complexity to the implementations of the PDCP protocol. Further, since PDCP is only intended for transmission of user plane traffic, in the proposed solution UE-CN signalling would be treated like user plane traffic, which implies that some modifications will most probably be needed also to the current Iu interface specifications. Further, in the proposed solution integrity protection needs to be implemented in two places: in PDCP layer for MM and higher layer signalling and in RRC layer for RRC signalling. As a consequence, the complexity of PDCP protocol increases and an additional header field is needed in PDCP data payload data units (PDU), since the integrity function requires a counter value to be transmitted with each piece of integrity protected data for use by the integrity protection algorithm.

SUMMARY OF THE INVENTION

An object of the invention is to realize a signalling method, which alleviates the aforementioned problems of prior art. A further object of the invention is to provide a method for transmission of control signalling, which allows determining of quality of service levels for different signalling traffic streams.

A still further object of the invention is to provide the aforementioned objects of the invention, without adding complexity in the protocol layers above the RRC protocol layer.

The objects are reached by setting up at least two signalling radio bearers for transmission of signalling traffic, and specifying rules for routing of higher layer signalling to the signalling radio bearers.

The method according to the invention is characterized by that, which is specified in the characterizing part of the independent method claim. The network clement according to the invention is characterized by that, which is specified in the characterizing part of the independent claim directed to a network element. The mobile communication means according to the invention is characterized by that, which is specified in the characterizing part of the independent claim directed to a mobile communication means. The dependent claims describe further advantageous embodiments of the invention.

According to the invention, at least two signalling radio bearers are set up for transmission of signalling traffic and the cellular network configures how the signalling of higher layer protocols is mapped to said signalling radio bearers. Multiple radio bearers can be allocated for transferring signalling traffic, but all higher layer signalling is in any case taken through the RRC protocol.

In the inventive method, MM and higher layer messages are sent using RRC DIRECT TRANSFER messages, but separate RLC entities can be set up for RRC DIRECT TRANSFER messages. In various embodiments of the invention, separate radio bearers can be set up for individual CN domains and/or upper layer protocols and/or for a group of RRC messages.

Routing of messages to signalling bearers can advantageously be performed on the basis of CN domain identity information contained in every RRC DIRECT TRANSFER data unit. In embodiments, in which separate radio bearers are set up for different upper layer protocols or different groups of upper layer protocols, the routing of RRC DIRECT TRANSFER data units is advantageously performed on the basis of examination of the contents of data units and interpreting, with which protocol each data unit is associated.

The inventive method provides integrity protection of MM and higher layer messages as a consequence of the transmission of the messages in RRC DIRECT TRANSFER messages. The inventive method allows controlling of priority between MM and higher layer messages and RRC messages in the radio interface by adjusting the QoS parameters of bearers used to transfer the messages.

BRIEF DESCRIPTION OF THE DRAWINGS

The invention is described in more detail in the following with reference to the accompanying drawings, of which FIG. 7 illustrates an example of the structure of a mobile communication means according to an advantageous embodiment of the invention.

DETAILED DESCRIPTION OF THE PREFERRED EMBODIMENTS

A. A First Group of Advantageous Embodiments of the Invention

Figure 1:
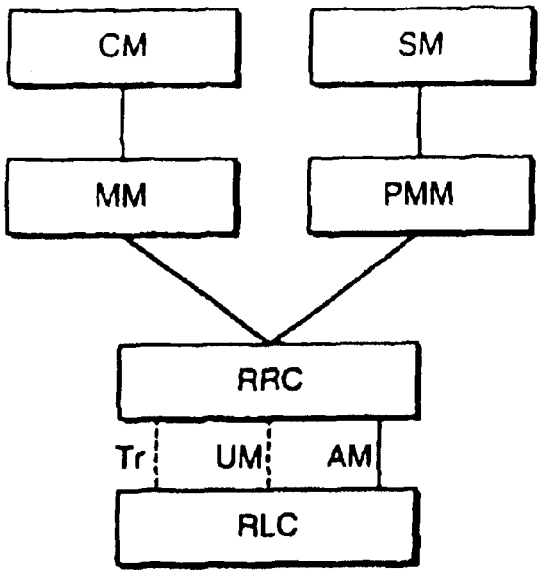
Fig. 1 PRIOR ART
FIG. 1 illustrates protocol stack configuration for signalling transfer according to prior art.
Figure 2:
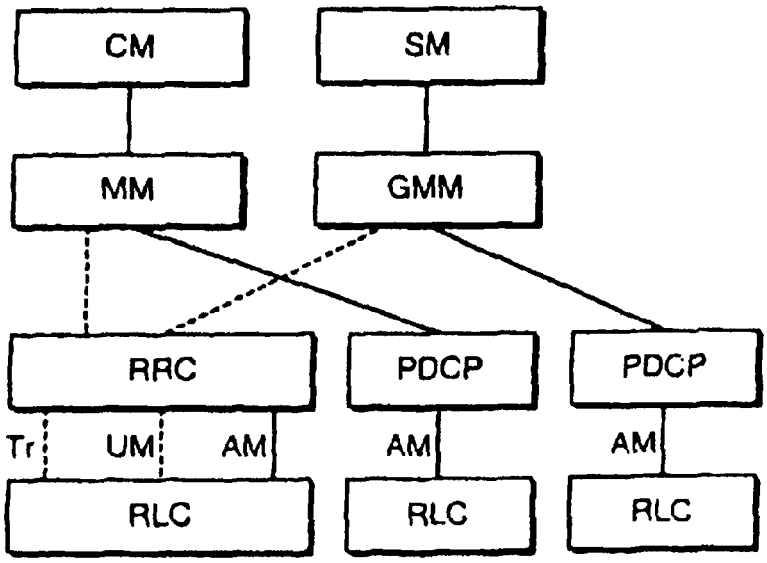
Fig. 2 PRIOR ART
FIG. 2 illustrates protocol stack configuration for signalling transfer according to another solution of prior art.
Figure 3:
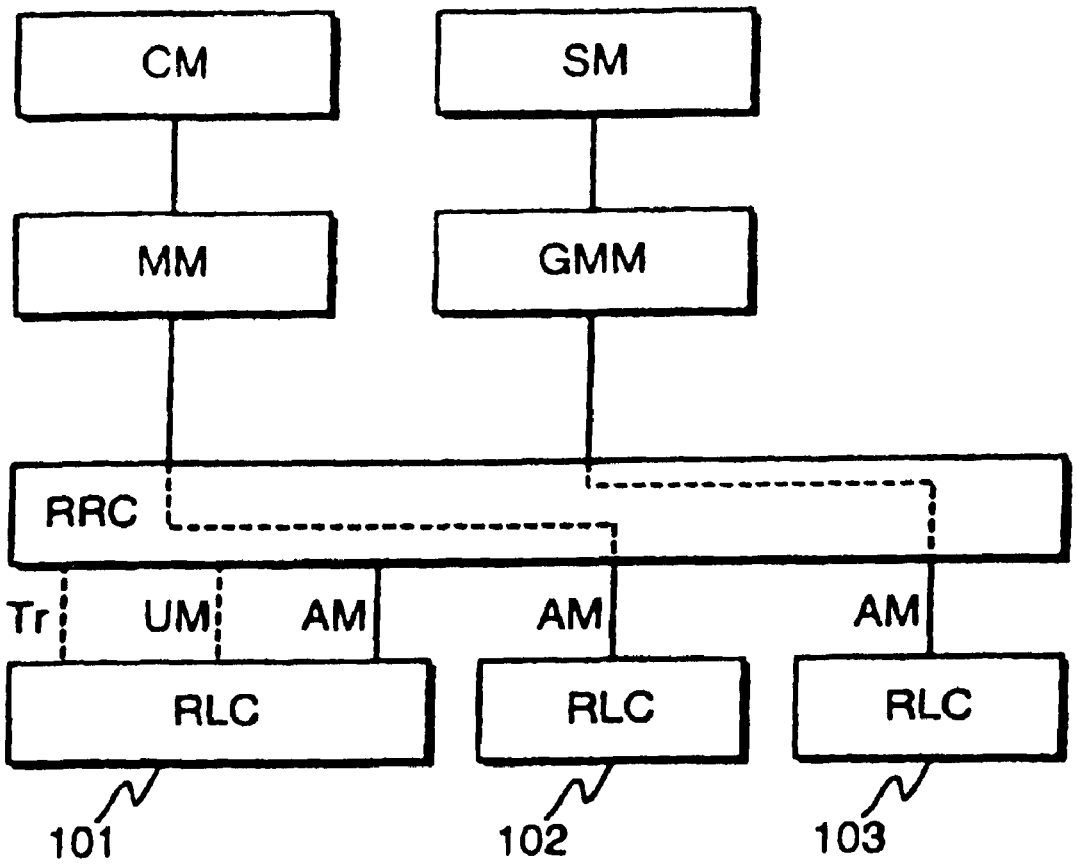
FIG. 3 illustrates protocol stack configuration for signalling transfer according to an advantageous embodiment of the invention.

FIG. 3 illustrates protocol stack configuration for signalling transfer according to an advantageous embodiment of the invention. This figure illustrates the example case that a separate radio bearer is reserved for each CN domain. In FIG. 3, each radio bearer is represented by a RLC entity corresponding to the radio bearer. FIG. 3 illustrates, that signalling from the circuit switched CN domain (CM, MM) is transmitted via a second RLC entity 102, while signalling from the packet switched CN domain (SM, PMM) is transmitted via a third RLC entity 103, while a first RLC entity is used for transmission of the rest of RRC messages.

According to the invention, the RRC protocol can use one or more signalling radio bearers (SRB) i.e. RLC entities for transmission of signalling traffic between the network and the mobile communication means, i.e. UE (user equipment). In other words, the signalling link between a UE and a RNC (radio network controller) can comprise one or more signalling radio bearers.

The UE can be commanded to use only one signalling radio bearer for all signalling. An additional signalling radio bearer can be set up and the RRC layer and the UE can be configured to send all RRC DIRECT TRANSFER messages using this additional signalling radio bearer. Further, more than one signalling radio bearers can be set up by the network. Preferably, the network makes the decisions about the configuration of the signalling radio bearers.

Different rules for using the more than one signalling radio bearers can be used in different embodiments of the invention.

For example, in an advantageous embodiment of the invention, separate signalling radio bearers are used for each CN domain protocol stack. Such an embodiment is illustrated in FIG. 3. In such an embodiment, the RRC layer can route the RRC DIRECT TRANSFER messages to correct radio bearer by checking the CN domain identification information in the data units comprising the messages.

As a second example, in an advantageous embodiment of the invention, separate signalling radio bearers are used for each higher layer protocol. In such an embodiment, the RRC layer can route the RRC DIRECT TRANSFER messages to correct radio bearer by checking the NAS (network access stratum) protocol discriminator information in the data units comprising the messages.

As a third example, in an advantageous embodiment of the invention, separate signalling radio bearers are used for various predefined groups of higher layer protocols. In such an embodiment, the RRC layer can route the RRC DIRECT TRANSFER messages to correct radio bearer by checking the NAS (network access stratum) protocol discriminator information in the data units comprising the messages. In such an embodiment, each signalling radio bearer carrying higher level protocol signalling has a corresponding predefined set of NAS protocol discriminators.

The invention is not limited to these rules for deciding about the usage of the signalling radio bearers, since other types of rules can as well be used. For example, the decision of which signalling radio bearer to use for any given message can in an embodiment of the invention based on the PDU size. In such an embodiment, the length of each message is checked, and the bearer to be used is selected at least partly on the basis of the result of this checking.

In a further advantageous embodiment of the invention, the routing is based on a Quality of Service parameter attached to the higher layer protocol data. In such an embodiment, higher layer protocols may add a QoS parameter to single messages, to plurality of messages, or for example to all messages in order to ensure, that the messages are routed via a signalling radio bearer fulfilling the desired QoS level. In such an embodiment, the RRC layer can route the RRC DIRECT TRANSFER messages to correct signalling radio bearer by checking the additional QoS class information from the data units comprising the messages. There can be for example a predefined set of QoS classes for higher layer signalling messages, for example two QoS classes, or the number of QoS classes can be decided by the network. Preferably, for each QoS class a separate radio bearer is set up. An example of this QoS class separation could be the short message service (SMS) which could use lower priority than other signalling.

The functionality for performing the decisions about the number of signalling radio bearers and about the rules for dividing traffic to these signalling radio bearers can be implemented in many different network elements of a radio access network (RAN). Preferably, the network element performing the decisions about the number of signalling radio bearers and about the rules for dividing traffic to these signalling radio bearers is the radio network controller (RNC).

In a further embodiment of the invention, the rules to be used can be selected out of a predefined set of rules by using the number of signalling radio bearers. In this embodiment, each possible amount of signalling radio bearers is associated with a predefined set of rules.

In a further advantageous embodiment of the invention, one of the signalling radio bearers can be defined as a master signalling radio bearer. This radio bearer is set up only in the RRC connection establishment procedure and released only in the RRC connection release procedure. This master SRB would be used as the prior art signalling bearer. Such an embodiment ensures, that all signalling bearers are not released in error during the RRC connection, since the master SRB in this embodiment cannot be controlled by radio bearer control messages.

B. A Second Group of Advantageous Embodiments of the Invention

Figure 4:
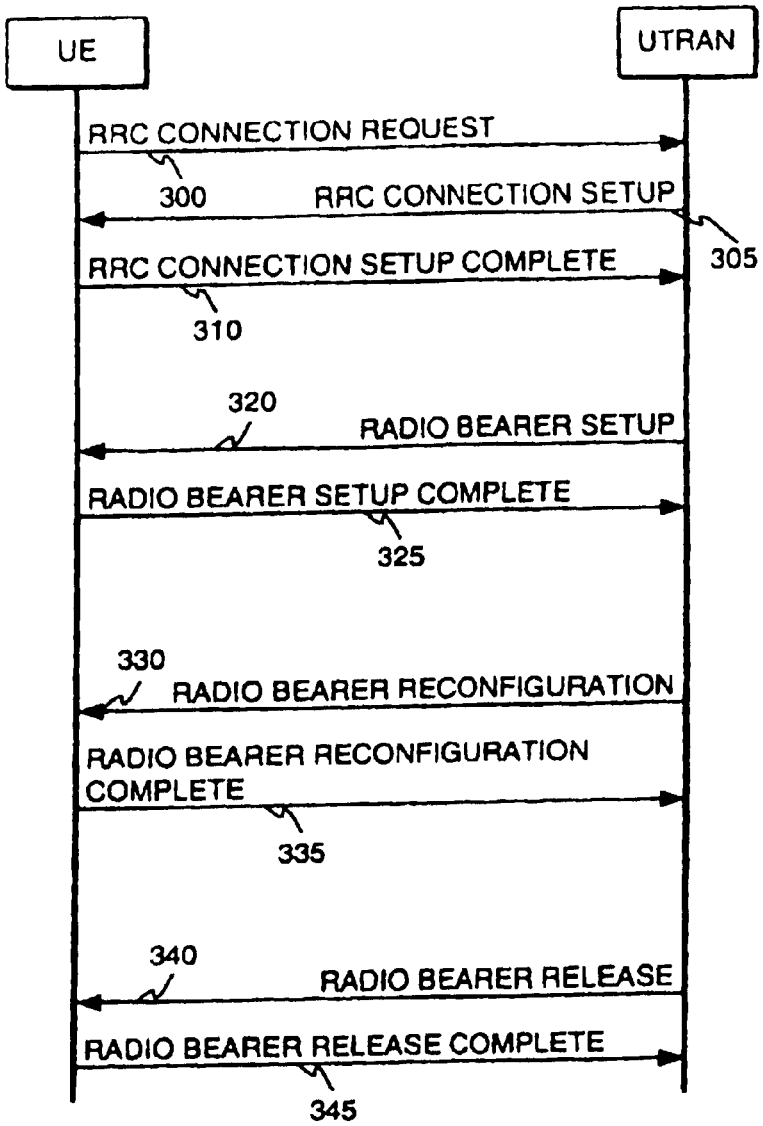
FIG. 4 illustrates RRC signalling related to radio bearers.

In an advantageous embodiment of the invention, the messages used for controlling radio bearers are used for controlling the signalling radio bearers as well. The messages are the RRC CONNECTION SETUP, RADIO BEARER RECONFIGURATION, RADIO BEARER RELEASE, and RADIO BEARER SETUP messages. The usage of the messages is described in the following with reference to FIG. 4. In the prior art, these messages are only used to control the user-plane radio bearers, not signalling. More details of the prior art use of these messages and a description of the other messages of the RRC protocols can be found in the RRC protocol specifications of the UMTS system. FIG. 4 illustrates four RRC layer procedures, namely RRC connection establishment, radio bearer setup, radio bearer reconfiguration, and radio bearer release procedures. The RRC connection establishment procedure initiates the RRC connection between the mobile communication means and the network, while the other three of these four procedures listed here are used to control single radio bearers and may or may not occur during the lifetime of a RRC connection. FIG. 4 shows signalling between a mobile communication means (UE, user equipment) and the radio access network (UTRAN, UMTS terrestrial radio access network).

The RRC connection establishment procedure is initiated by the UE, which sends 300 a RRC CONNECTION REQUEST message to the radio access network. The radio access network responds to the message by sending a RRC CONNECTION SETUP message, which comprises information about various parameters about the RRC connection to be established. The UE finishes the RRC connection establishment procedure by sending 310 a RRC CONNECTION SETUP COMPLETE message.

The radio bearer setup procedure is initiated by the network, which sends 320 a RADIO BEARER SETUP message to the UE. The message comprises information about various parameters of the radio bearer about to be established. The UE responds to the message by sending 325 a RADIO BEARER SETUP COMPLETE message.

The radio bearer reconfiguration procedure is initiated by the network, which sends 330 a RADIO BEARER RECONFIGURATION message to the UE. The message comprises information about new values of parameters for the radio bearer or bearers affected. The UE responds to the message by sending 335 a RADIO BEARER RECONFIGURATION COMPLETE message.

The radio bearer release procedure is initiated by the network, which sends 340 a RADIO BEARER RELEASE message to the UE. The message comprises information identifying the bearer to be released. The UE responds to the message by sending 335 a RADIO BEARER RELEASE COMPLETE message.

According to an advantageous embodiment of the invention, the setting up and configuration of all the signalling radio bearers is done during the RRC connection establishment procedure. This can advantageously be effected by adding information about the signalling radio bearers to be established to the RRC CONNECTION SETUP message. One advantageous example of the organization of such information is presented later in this application.

In one advantageous embodiment of the invention, only one signalling radio bearer is set up and configured during the RRC connection establishment procedure. In such an embodiment, further signalling radio bearers can be set up and configured later during the RRC connection, if need for that arises.

In an advantageous embodiment of the invention, the radio access network can set up additional Signalling Radio Bearers during the RRC connection and configure how the higher layer signalling is mapped into the new and existing signalling radio bearers. This can advantageously be effected by adding information about the signalling bearers to be established to the RADIO BEARER SETUP message. One advantageous example of the organization of such information is presented later in this application.

In an advantageous embodiment of the invention, the radio access network can re-configure the mapping between higher layer signalling and any existing signalling radio bearer during the RRC connection. This can advantageously be effected by adding information about the signalling bearers to be reconfigured to the RADIO BEARER RECONFIGURATION message. One advantageous example of the organization of such information is presented later in this application.

In an advantageous embodiment of the invention, the radio access network can release any signalling radio bBearers during the RRC connection and reconfigure the mapping between higher layer signalling and any remaining signalling radio bearers. This can advantageously be effected by adding information about the signalling bearers to be released and the new reconfiguration information to the RADIO BEARER RELEASE message. One advantageous example of the organization of such information is presented later in this application. The following paragraphs and tables show examples according to various advantageous embodiments of the invention about how information pertaining to signalling radio bearers can be presented in the referred messages.

In the RRC CONNECTION SETUP message, the information about signalling radio bearers can be presented among the radio bearer information elements as shown in the following table. Note that for clarity, the following table lists only radio bearer (RB) information elements of the message.

| RB information elements<br>Information Element | Range |
|---|---|
| Signalling Radio Bearer information | 0 to <MaxSRBCount> |
| RB identity | |
| Signalling Radio Bearer type | |
| RB mapping info | |
| SRB mapping info | |

The parameter "Signalling Radio Bearer information" indicates the number of signalling radio bearers. The other four parameters are then repeated the indicated number of times. The parameter "RB identity" identifies the radio bearer. The purpose of the "Signalling Radio Bearer Type" information element is to indicate the RLC parameters needed for the Signalling Radio Bearer. Advantageously, each possible value of "Signalling Radio Bearer Type" information element refers to a predefined set of parameters. The parameter "RB mapping info" indicates, as in prior art, details about multiplexing RLC frames to physical layer channels. The parameter "SRB mapping info" indicates how various protocol messages are mapped to the particular SRB. The parameter "MaxSRBCount" defines the maximum number of signalling radio bearers.

In the RADIO BEARER RECONFIGURATION message, the SRB information can be represented by a "SRB mapping info" parameter among the RB information elements. The parameter is optional, and only present if the particular radio bearer is a signalling radio bearer.

In the RADIO BEARER RELEASE message, the SRB information can be represented by a "SRB mapping info" parameter among the RB information elements. The parameter is optional, and only present if the particular radio bearer is a signalling radio bearer.

In the RADIO BEARER SETUP message, the SRB information can be represented by a "SRB mapping info" parameter among the new RB information elements, if the particular new RB is to be a SRB, and by a "SRB mapping info" parameter among information elements for other radio bearers affected by the message, if the particular other RB is a SRB. These parameters are optional, and only present if the particular radio bearer is a signalling radio bearer.

In one advantageous embodiment of the invention, the allowed values of "SRB mapping info" parameter i.e. information element range from 0 to 7 with the following meanings:

0 all RRC signalling 1 all RRC signalling except RRC Direct Transfer messages 2 all RRC Direct Transfer messages 3 RRC Direct Transfer messages with specified CN Domain Identities 4 RRC Direct Transfer messages carrying NAS message with the specified PD 5 only the specified RRC messages 6–7 reserved for future use If the value is 3, 4, or 5, then also information elements describing details of correspondingly CN domain identities, NAS PD information, and RRC message types are present.

C. A Third Group of Advantageous Embodiments of the Invention

Figure 5:
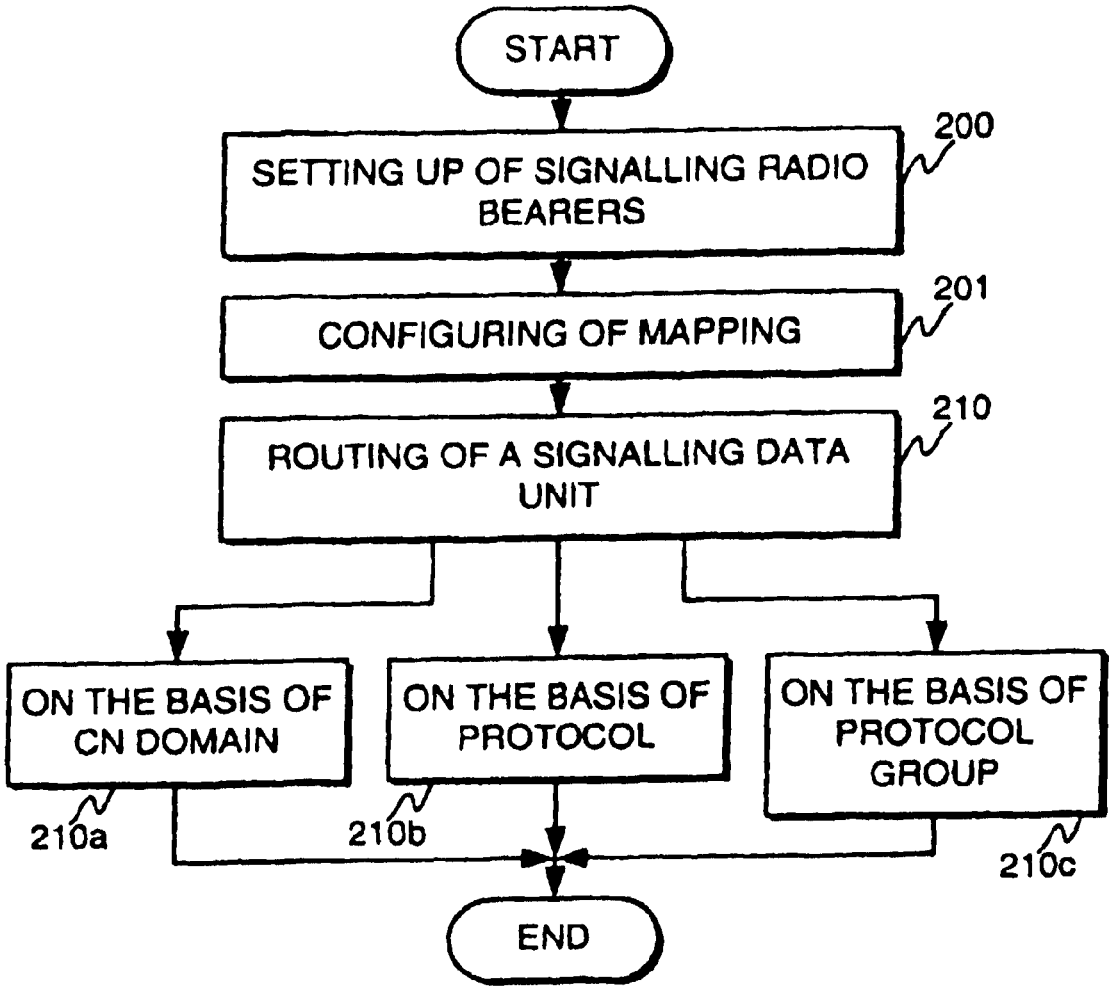
FIG. 5 illustrates a method according to an advantageous embodiment of the invention.

FIG. 5 illustrates a method according to an advantageous embodiment of the invention. FIG. 5 illustrates a method for transmission of signalling data in a cellular telecommunication system between the cellular network and a mobile communication means. According to the example of FIG. 5, the method comprises steps of setting up 200 of at least two signalling radio bearers for transmission of signalling traffic, and configuring 201 of how the signalling of higher layer protocols is mapped to said signalling radio bearers.

According to an advantageous embodiment of the invention, the method further comprises the step of routing 210 of signalling traffic data units via said at least two signalling radio bearers according to predefined rules.

In a further advantageous embodiment of the invention, said predefined rules are set by a network element of a radio access network of the cellular telecommunication system.

In a still further advantageous embodiment of the invention, said predefined rules are set by a radio network controller.

According to an advantageous embodiment of the invention, in said step of routing 210, signalling from different core network domains is routed 210a via separate signalling radio bearers.

According to a further advantageous embodiment of the invention, in said step of routing 210, signalling of a higher layer protocol is routed 210b via a signalling radio bearer specific to said higher layer protocol.

According to a still further advantageous embodiment of the invention, in said step of routing 210, signalling traffic of a predefined group of higher layer protocols is routed 210c via a signalling radio bearer corresponding to said predefined group.

According to a still further advantageous embodiment of the invention, in said step of routing, signalling traffic of higher layer protocols is routed via a signalling radio bearer based on a Quality of Service parameter attached to the higher layer protocol data.

In a further advantageous embodiment of the invention, said setting up and configuration of said signalling radio bearers is performed during the RRC connection establishment procedure.

In an even further advantageous embodiment of the invention, the method comprises steps of setting up of a further signalling radio bearer during the RRC connection, and configuring the mapping of higher layer signalling to said further signalling radio bearer and previously existing signalling radio bearers.

In an even further advantageous embodiment of the invention, the method comprises the step of reconfiguring the mapping of higher layer signalling to said signalling radio bearers.

In an even further advantageous embodiment of the invention, the method comprises the step of releasing a signalling radio bearer.

D. A Fourth Group of Advantageous Embodiments of the Invention

Figure 6:
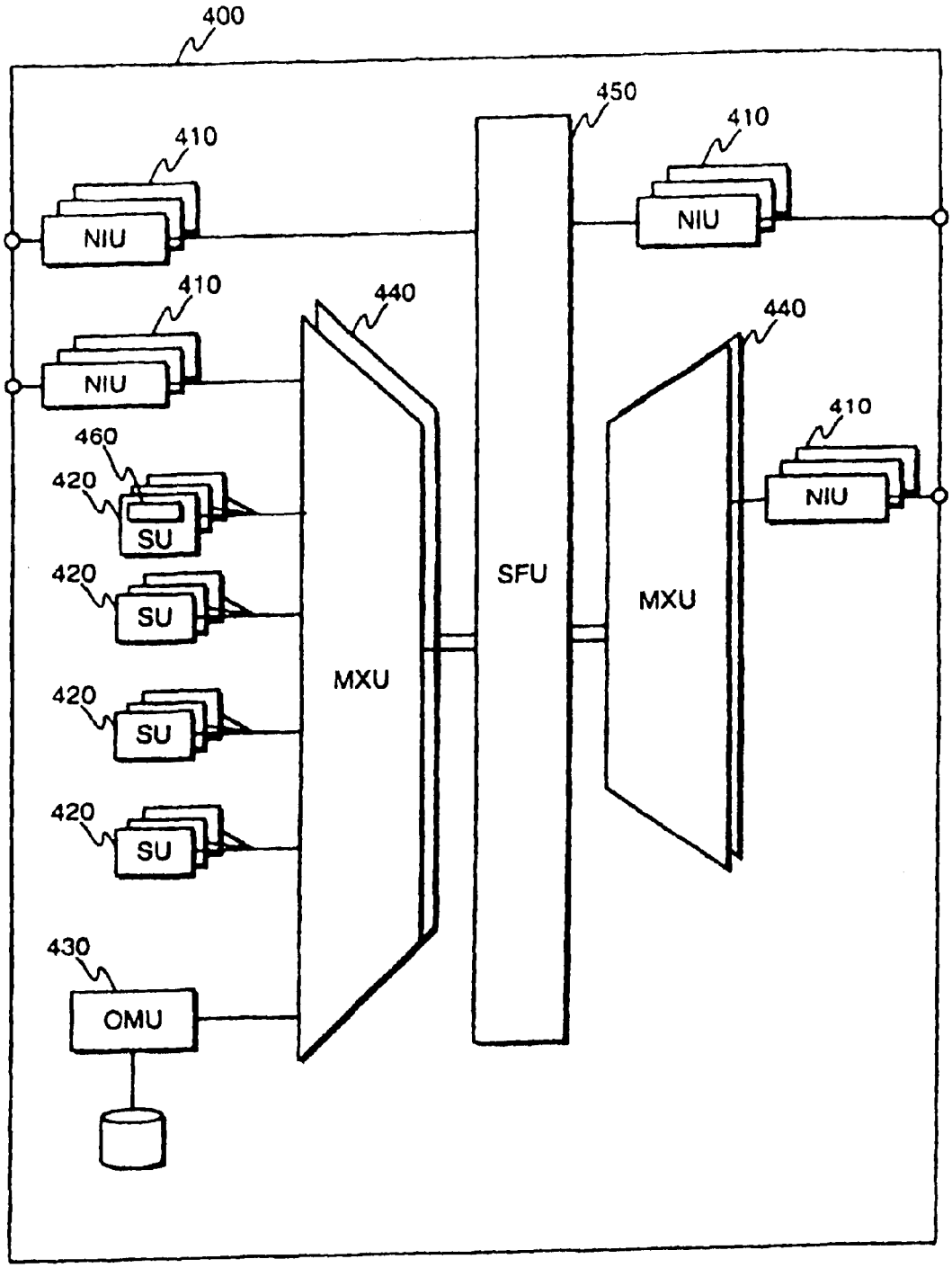
FIG. 6 illustrates an example of the structure of a radio network controller according to an advantageous embodiment of the invention.

FIG. 6 illustrates the functional structure of a typical radio network controller 400 of a cellular telecommunications network using as an example the structure of a RNC of a UMTS radio network utilizing WCDMA (wideband code division multiple access) transmission method. The invention is not limited to the UMTS system, but can be used in other similar systems as well.

The radio network controller 400 comprises a switching fabric unit (SFU) 450 to which several control processor units can be connected. Multiplexing units (MXU) 440 can be used between a number of processor units and the SFU to map the low bit rate data flows from the processor units into the high bit rate data flows of the SFU input ports. The network interface units (NIU) 410 handle the physical layer connections to different interfaces, such as Iub interface toward Node B elements, Iur interface towards other RNCs, and the Iu interface towards core network nodes. The operations and maintenance unit (OMU) 430 contains the RNC configuration and fault information and can be accessed from external operations and maintenance center. The signalling units (SU) 420 implement all the control and user plane protocols required in the RNC. Accordingly, the invention can be implemented in a RNC in the signalling units 420. The invention can be implemented using means 460 comprising software executed in the processors of the signalling units, which software causes the signalling units to perform according to the invention.

In an advantageous embodiment of the invention, a network element of a radio access network of a cellular telecommunication system is provided. According to the embodiment, the network element is arranged to set up at least two signalling radio bearers for transmission of signalling traffic and to configure how the signalling of higher layer protocols is mapped to said signalling radio bearers.

In a further advantageous embodiment of the invention, the network element is a radio network controller.

FIG. 7 illustrates roughly the functional structure of a typical mobile communication means (UE) 500. The UE comprises a user interface (UI) 550, a control unit 540, a DSP unit 530, an RF unit 520, and an antenna 510. The RF unit handles the radio frequency processing of received and transmitted signals and converts the received signals to digital form. The DSP unit handles physical layer processing such as interleaving, channel coding, multiplexing, and segmentation. The DSP unit 530 can also implement a part of or all of layer 2 radio protocols such as the MAC, RLC, and PDCP protocols. Layer 3 protocols such as the RRC, MM, and CM protocols and typically also a part of layer 2 protocols are implemented in the control unit 540. Accordingly, the invention can be implemented in a UE in the control unit 540. The invention can be implemented using means 560 comprising software executed in the processor *570* of the control unit, which software causes the control unit to perform according to the invention.

According to a further advantageous embodiment of the invention, a mobile communication means for a cellular telecommunication system is provided. According to the embodiment, the mobile communication means is arranged to route radio resource control protocol messages to at least two signalling radio bearers as instructed by the cellular telecommunication system.

E. Further Considerations

The present invention has several advantages. For example, the inventive solution retains the beneficial aspects of the prior art solutions described previously, while retaining the present specifications as unmodified as possible. Further, the inventive approach allows keeping of integrity protection in one protocol layer only, i.e. in RRC. The inventive method avoids the prior art problem of increasing the complexity of the PDCP protocol.

The inventive method is at the time of writing this patent application fully compatible with the present solutions regarding CND domain concepts and routing of higher layer signalling messages from or to CN domains based on CN domain identification information. The inventive method also requires no changes to Iu interface specifications. The inventive method also allows prioritization between different types of signalling, such as between RRC signalling and higher layer signalling. The inventive method further allows the use of different QoS parameters for different types of signalling. Further, the inventive solution will also allow usage of different integrity algorithm for NAS (network access stratum) and AS (access stratum) signalling, if that would be later required. This can be effected by allocating separate bearers for these signalling flows, and applying a bearer specific integrity algorithm for the bearers.

In the present application the term signalling is intended to cover transmission of messages of various protocols controlling various aspects of the functioning of the cellular telecommunication systems, i.e. other transmissions than payload data transmissions.

The term higher layer protocol is in this application and particularly in the accompanying claims intended to cover the Radio Resource Control protocol and any other layer 3 protocol acting between the mobile station and the radio access network and all layer 3 or higher layer signalling protocols between the mobile station and core network, such as for example the Mobility Management, Call Control, and Session Management protocols.

The invention is applicable in so called third generation mobile cellular systems, such as the UMTS system (universal mobile telecommunication system) and corresponding systems. The various message names such as the RRC DIRECT TRANSFER message name are intended to be examples only, and the invention is not limited to using the message names recited in this specification.

In view of the foregoing description it will be evident to a person skilled in the art that various modifications may be made within the scope of the invention. While a preferred embodiment of the invention has been described in detail, it should be apparent that many modifications and variations thereto are possible, all of which fall within the true spirit and scope of the invention.

What is claimed is:

1. A method for transmitting signalling data between a cellular network and a mobile communication means in a cellular telecommunication system, comprising the steps of:

setting up at least two signalling radio bearers for transmission of signalling traffic, and configuring, through action of the cellular network, how the signalling of certain higher layer protocols is mapped to said at least two signalling radio bearers.

2. A method according to claim 1, additionally comprising the step of routing signalling traffic data units via said at least two signalling radio bearers according to predefined rules.

3. A method according to claim 2, wherein said predefined rules are set by a network element of a radio access network of the cellular telecommunication system.

4. A method according to claim 3, wherein said predefined rules are set by a radio network controller.

5. A method according to claim 2, wherein said step of routing signalling traffic data units via said at least two signalling radio bearers comprises the substep of routing signalling related to different core network domains via separate signalling radio bearers.

6. A method according to claim 2, wherein said step of routing signalling traffic data units via said at least two signalling radio bearers comprises the substep of routing signalling of a higher layer protocol via a signalling radio bearer specific to said higher layer protocol.

7. A method according to claim 2, wherein said step of routing signalling traffic data units via said at least two signalling radio bearers comprises the substep of routing signalling traffic of a predefined group of higher layer protocols via a signalling radio bearer corresponding to said predefined group.

8. A method according to claim 2, wherein said step of routing signalling traffic data units via said at least two signalling radio bearers comprises the substep of routing signalling traffic of higher layer protocols via a signalling radio bearer based on a Quality of Service parameter attached to the higher layer protocol data.

9. A method according to claim 1, wherein the steps of setting up and configuring said signalling radio bearers are performed during a radio resource control (RRC) connection establishment procedure.

10. A method according to claim 1, additionally comprising the steps of:

setting up a further signalling radio bearer during a radio resource control (RRC) connection, and configuring the mapping of higher layer signalling to said further signalling radio bearer and previously existing signalling radio bearers.

11. A method according to claim 1, additionally comprising the step of later reconfiguring the mapping of higher layer signalling to said signalling radio bearers.

12. A method according to claim 1, additionally comprising the step of releasing a signalling radio bearer.

13. A network element of a radio access network of a cellular telecommunication system, wherein the improvement lies in that the network element is arranged to set up at least two signalling radio bearers for transmission of signalling traffic and to configure how the signalling of higher layer protocols is mapped to said signalling radio bearers.

14. A network element according to claim 13, wherein the network element is a radio network controller.

15. A mobile communication means for a cellular telecommunication system, wherein the improvement lies in that the mobile communication means is arranged to route radio resource control protocol messages to at least two signalling radio bearers as instructed by the cellular telecommunication system.

*16. An apparatus comprising:*

*a control unit; and*

*a processor in the control unit, the processor configured to cause the control unit to route one or more radio resource control (RRC) or higher layer messages to at least two signaling radio bearers as instructed by a cellular telecommunication system.*

*17. The apparatus of claim 16, wherein the processor is further configured to cause the control unit to determine a quality of service associated with at least one of the one or more RRC or higher layer messages.*

*18. The apparatus of claim 16, wherein the processor is further configured to cause the control unit to route at least one of the one or more RRC or higher layer messages to a signaling radio bearer corresponding with a quality of service associated with the at least one RRC or higher layer message.*

*19. The apparatus of claim 18, wherein the processor is further configured to cause the control unit to determine to which of a predefined set of quality of service classes the at least one RRC or higher layer message has been assigned.*

*20. The apparatus of claim 19, wherein separate signaling radio bearers exist for each quality of service class of the set of quality service classes, wherein the routing of one or more RRC or higher layer messages as instructed by a cellular telecommunication system further comprises routing respective messages to a signaling radio bearer associated with the quality of service class to which the message has been assigned.*

*21. The apparatus of claim 16, wherein respective RRC or higher layer messages are associated with a core network domain, and wherein the processor is further configured to cause the control unit to route respective RRC or higher layer messages based at least in part on the core network domain with which the respective messages are associated.*

*22. The apparatus of claim 21, wherein the core network domain is a circuit switched core network domain or a packet switched core network domain, and wherein a separate signaling radio bearer exists for each of the circuit switched core network domain and the packet switched core network domain.*

*23. The apparatus of claim 16, wherein the processor is further configured to cause the control unit to route respective RRC or higher layer messages to the at least two signaling radio bearers based at least in part on which of a plurality of protocols is associated with the respective messages.*

*24. The apparatus of claim 23, wherein a separate signaling radio bearer exists for each of the plurality of protocols.*

*25. The apparatus of claim 16, wherein the processor is further configured to cause the control unit to route the one or more RRC or higher layer messages as instructed by a network element of a radio access network of the cellular telecommunication system.*

*26. The apparatus of claim 25, wherein the network element comprises a radio network controller.*

*27. The apparatus of claim 16, wherein the processor is further configured to cause the control unit to receive a RRC connection setup message comprising an indication of a number of signaling radio bearers to be established, an indication of one or more radio link control parameters needed for each of the signaling radio bearers to be established, and an indication of which RRC or higher layer messages are mapped to each of the signaling radio bearers to be established.*

*28. The apparatus of claim 16, wherein the processor is further configured to cause the control unit to receive a radio bearer setup message associated with a signaling radio bearer to be established, the radio bearer setup message comprising instructions for routing at least one of the RRC or higher layer messages to the associated signaling radio bearer.*

*29. The apparatus of claim 16, wherein the one or more RRC or higher layer messages are selected from a mobility manager layer message, a connection management layer message, a session management layer message, or a packet switched domain mobility management layer message.*

*30. An apparatus comprising:*

*a control unit; and*

*a processor in the control unit, the processor configured to cause the control unit to route one or more radio*

*resource control (RRC) protocol messages to at least two signaling radio bearers as instructed by a cellular telecommunications system.*

*31. The apparatus of claim 30, wherein the one or more RRC protocol messages comprise one or more messages generated by a RRC layer and one or more messages generated by at least one layer higher than the RRC layer.*

*32. The apparatus of claim 31, wherein the one or more messages generated by the at least one layer higher than the RRC layer are selected from a mobility management layer message, a connection management layer message, a session management layer message, or a packet switched domain mobility management layer message.*

*33. The apparatus of claim 31, wherein at least one of the at least two signaling radio bearers is associated with the one or more RRC protocol messages generated by the RRC layer.*

*34. The apparatus of claim 31, wherein at least one of the at least two signaling radio bearers is associated with the one or more RRC protocol messages generated by the at least one layer higher than the RRC layer.*

*35. An apparatus comprising:*

*a control unit; and*

*a processor in the control unit, the processor configured to cause the control unit to route one or more higher layer protocol messages to at least three signaling radio bearers as instructed by a cellular telecommunication system.*

*36. The apparatus of claim 35, wherein at least one of the one or more higher layer protocol messages comprises a message generated by a radio resource control (RRC) protocol layer.*

*37. The apparatus of claim 36, wherein at least two of the at least three signaling radio bearers are associated with the RRC protocol layer message.*

*38. The apparatus of claim 37, wherein one of the signaling radio bearers associated with the RRC protocol layer message is configured for unacknowledged mode transfer of the RRC protocol layer message.*

*39. The apparatus of claim 37, wherein one of the signaling radio bearers associated with the RRC protocol layer message is configured for acknowledged mode transfer of the RRC protocol layer message.*

*40. The apparatus of claim 36, wherein at least one of the one or more higher layer protocol messages comprises a message generated by a protocol layer higher than the RRC protocol layer.*

*41. The apparatus of claim 40, wherein at least one of the at least three signaling radio bearers is associated with the message generated by a protocol layer higher than the RRC protocol layer.*

*42. A network element of a radio access network of a cellular telecommunication system, wherein the improvement lies in that the network element comprises:*

*means for setting up at least two signaling radio bearers for transmission of signaling traffic and means for configuring how the signaling of higher layer protocols is mapped to the signaling radio bearers.*

*43. A mobile communication means for a cellular telecommunication system, wherein the improvement lies in that the mobile communication means comprises:*

*means for routing radio resource control protocol messages to at least two signaling radio bearers as instructed by the cellular telecommunication system.*

*44. An apparatus comprising:*

*a mobile communications device; and*

*a control unit in the mobile communications device configured to route messages to at least two signaling radio bearers as instructed by a cellular telecommunication system.*

*45. The apparatus of claim 44 wherein the messages comprise one or more radio resource control and higher layer protocol messages.*

*46. The apparatus of claim 45, wherein the messages are routed according to predefined rules.*

*47. The apparatus of claim 46, wherein the predefined rules are set by a network element of a radio access network of the cellular telecommunication system.*

*48. The apparatus of claim 44, wherein the control unit is further configured to route messages of a higher layer protocol to a signaling radio bearer specific to the higher layer protocol.*

*49. The apparatus of claim 44, wherein the control unit is further configured to route messages of a predefined group of higher layer protocols to a signaling radio bearer corresponding to the predefined group.*

*50. The apparatus of claim 44, wherein the control unit is further configured to route messages of higher layer protocols to a signaling radio bearer based on a Quality of Service parameter attached to the higher layer protocol data.*

*51. The apparatus of claim 50, wherein the control unit is further configured to check at least one Quality of Service class, wherein a separate radio bearer is set up for each of the at least one Quality of Service class.*

*52. A method comprising:*

*in a user equipment, routing one or more radio resource control protocol messages to at least two signaling radio bearers as instructed by a network.*

*53. The method of claim 52, wherein the one or more radio resource control protocol messages comprise higher layer protocol data, such that routing the one or more radio resource control protocol messages comprises routing higher layer protocol data to the at least two signaling radio bearers as instructed by the network.*

*54. The method of claim 53, further comprising routing the higher layer protocol data based on a Quality of Service parameter attached to the higher layer protocol data.*

*55. The method of claim 52, further comprising routing the one or more radio resource control protocol messages based on a Quality of Service parameter attached to the radio resource control protocol message.*

* * * * *